(12) United States Patent
Shamis (10) Patent No.: US 11,280,265 B2
(45) Date of Patent: Mar. 22, 2022

(54) GAS TURBINE ENGINE HAVING BLADELESS FIRST STAGE AND EJECTORS

(71) Applicant: Evgeni Shamis, Bat Yam (IL)

(72) Inventor: Evgeni Shamis, Bat Yam (IL)

( * ) Notice: Subject to any disclaimer, the term of this patent is extended or adjusted under 35 U.S.C. 154(b) by 266 days.

(21) Appl. No.: 16/404,822

(22) Filed: May 7, 2019

(65) Prior Publication Data

US 2020/0355125 A1 Nov. 12, 2020

(51) Int. Cl.
| | |
|---|---|
| *F02C 3/16* | (2006.01) |
| *F02C 9/18* | (2006.01) |
| *F02C 9/50* | (2006.01) |
| *F02C 3/32* | (2006.01) |

(52) U.S. Cl.
CPC ............ *F02C 3/165* (2013.01); *F02C 3/16* (2013.01); *F02C 3/32* (2013.01); *F02C 9/18* (2013.01); *F02C 9/50* (2013.01)

(58) Field of Classification Search
CPC .... F02C 3/16; F02C 3/165; F02C 3/32; F02C 5/04; F02C 9/18; F02C 9/50; F02K 7/005; F23R 3/425
See application file for complete search history.

(56) References Cited

U.S. PATENT DOCUMENTS

| | | | | |
|---|---|---|---|---|
| 2,444,742 A | * | 7/1948 | Lutjen | F02C 3/16 60/785 |
| 2,551,111 A | * | 5/1951 | Goddard | F02K 9/00 60/39.35 |
| 2,603,947 A | * | 7/1952 | Howard | F02K 7/005 60/39.35 |
| 2,605,608 A | * | 8/1952 | Barclay, Jr. | B64C 27/18 60/243 |
| 2,709,889 A | * | 6/1955 | Mount | F02C 3/165 60/201 |
| 3,541,787 A | * | 11/1970 | Romoli | F02C 3/165 60/776 |
| 3,699,771 A | * | 10/1972 | Chelminski | F02K 7/005 60/39.35 |
| 4,229,938 A | * | 10/1980 | Gallagher | F02C 5/04 60/39.34 |

(Continued)

OTHER PUBLICATIONS

"GE 9HA.02 claims 64% efficiency in combined cycle", Turbomachinerymag.com, 2017. Obtained from <https://www.turbomachinerymag.com/market-challenged-ge-continues-to-improve-gas-turbine-efficiency/> on Apr. 8, 2021 (Year: 2017).*

*Primary Examiner* — Alain Chau
(74) *Attorney, Agent, or Firm* — Mark M. Friedman (57) ABSTRACT

A gas turbine engine comprising a central power shaft; a rotatable turbine impeller on the shaft, a compressor configured to receive power from the central power shaft, the compressed air exiting the compressor entering a cavity of the impeller. Ejector(s) mounted on a periphery of the impeller having a combustion chamber including an outer wall; a mixing chamber downstream of the combustion chamber, a passageway to the mixing chamber from outside the combustion chamber for ejected (outside) air to enter the ejector and travel to the mixing chamber where the ejected air mixes with a flow of hot gases that has exited the combustion chamber to create a mixed flow of gases. A convergent-divergent nozzle at an exit of the mixing chamber accelerates the mixed flow of gases moving through the nozzle, thereby creating a reaction thrust and a moment of force on the shaft.

16 Claims, 4 Drawing Sheets

(56) References Cited

U.S. PATENT DOCUMENTS

| | | | | |
|---|---|---|---|---|
| 5,408,824 A * | 4/1995 | Schlote | ............... | F02C 3/165 60/39.35 |
| 5,934,873 A * | 8/1999 | Greene | ............... | F02K 7/005 416/22 |
| 6,295,802 B1 * | 10/2001 | Lior | ............... | F02C 3/165 60/39.35 |
| 6,668,539 B2 * | 12/2003 | Schlote | ............... | F02C 3/165 60/39.35 |
| 6,996,971 B2 * | 2/2006 | Schlote | ............... | F02C 3/165 60/39.35 |
| 10,280,838 B2 * | 5/2019 | Lee | ............... | F02C 3/165 |
| 2003/0033808 A1 * | 2/2003 | Schlote | ............... | F01D 1/32 60/772 |
| 2007/0214794 A1 * | 9/2007 | Tweeton | ............... | F02C 3/165 60/767 |
| 2017/0082022 A1 * | 3/2017 | Lee | ............... | F02C 7/222 |

* cited by examiner

GAS TURBINE ENGINE HAVING BLADELESS FIRST STAGE AND EJECTORS

FIELD AND BACKGROUND OF THE INVENTION

The invention is in the field of gas turbine engines with a jet turbine.

Gas turbine engines are currently in wide use as engines of continuous action. In these engines, the thermal energy of fuel combustion is converted to mechanical work on the shaft of the blade complex. The main elements of the construction are the rotor (the working blades, fixed on discs), and the stator, realized as a vane apparatus (directing blades attached to the corpus). The main advantage of a gas turbine engine is its high power-to-weight ratio: more than 6 kW per 1 kg of engine weight. This motivates the use of gas turbine engines in aviation. However, gas turbine engines possess several major disadvantages: the high cost (much higher than the cost of a reciprocating engine of the same power). The high cost is due to the use of expensive materials with high thermal stability and thermal endurance in the construction, as well as to the complex manufacturing technology of the gas turbine engines. The efficiency of gas turbine engines which are currently in use does not exceed 30-32%, whereas the efficiency of reciprocating engines reaches up to 41-42%). The current construction schemes of gas turbine engines require the use of gases with compression ratios of 25-30 and above. The compressors used in modern gas turbine engines consume up to 50%, of the fuel energy, thus reducing the efficiency of the engine. Due to these drawbacks the use of gas turbines outside aviation is currently limited.

SUMMARY OF THE INVENTION

One aspect of the present invention is a gas turbine engine, comprising a central power shaft; a rotatable turbine impeller mounted on the shaft and having a cavity; a compressor configured to receive power from the central power shaft and configured such that compressed air exiting the compressor enters the cavity of the impeller; one or more ejectors mounted on a periphery of the impeller, each ejector having a combustion chamber including an outer wall; a mixing chamber downstream of the combustion chamber; a passageway to the mixing chamber for ejected air to enter the ejector and bypass the combustion chamber while traveling to the mixing chamber such that in the mixing chamber the ejected air mixes with a flow of hot gases that has exited the combustion chamber to create a mixed flow of gases; and a convergent-divergent nozzle at an exit of the mixing chamber that accelerates the mixed flow of gases moving through the convergent-divergent nozzle, thereby creating a reaction thrust and a moment of force on the shaft.

In some embodiments, an efficiency of the gas turbine engine is at least 50%. In some embodiments, an efficiency of the gas turbine engine is between 50% and 60%.

In some embodiments, a temperature of the mixed flow of gases at an exit of each ejector does not exceed 350 K.

In some embodiments, a temperature of the flow of hot gases exiting the combustion chamber is more than six times a temperature of the mixed flow of gases exiting the nozzle.

In some embodiments, for each ejector the mixed flow of gases exits the ejector tangentially to the turbine impeller.

In some embodiments, for each ejector a gas expansion ratio in the ejector is at least one hundredfold a compression ratio of the compressor. In some embodiments, for each ejector a gas expansion ratio in the ejector is at least four hundredfold a compression ratio of the compressor. In some embodiments, for each ejector a gas expansion ratio in the ejector is at least a thousandfold a compression ratio of the compressor.

In some embodiments, the compression ratio of the compressor is less than 6.0 for a circumferential velocity of each ejector of 500 m/s. In some embodiments, the compression ratio of the compressor is less than 6.0 for a circumferential velocity of each ejector of 475 m/s. In some embodiments, the compression ratio of the compressor is less than 5.5 for a circumferential velocity of each ejector of 425 m/s.

In some embodiments, the engine is bladeless at least in a first stage turbine.

In some embodiments, the one or more ejectors comprise at least two ejectors. In some embodiments, the one or more ejectors comprise at least three ejectors. In some embodiments, the one or more ejectors comprise from three to nine ejectors.

A further aspect of the invention is a bladeless gas turbine engine, comprising a central power shaft; a rotatable turbine impeller mounted on the shaft and having a cavity; a compressor having a compression ratio of six or less, the compressor receiving power from the central power shaft and configured such that compressed air exiting the compressor enters the cavity of the impeller; two or more ejectors mounted on a periphery of the impeller, each ejector having a combustion chamber including an outer wall; a mixing chamber downstream of the combustion chamber; a passageway to the mixing chamber for ejected air to enter the ejector and bypass the combustion chamber while traveling to the mixing chamber such that in the mixing chamber the ejected air mixes with a flow of hot gases that has exited the combustion chamber to create a mixed flow of gases; and a convergent-divergent nozzle configured such that the mixed flow of gases exiting the mixing chamber enter the convergent-divergent nozzle and is accelerated in both a convergent portion of the convergent-divergent nozzle and in a divergent portion of the convergent-divergent nozzle, thereby creating a reaction thrust and a moment of force on the shaft, wherein a temperature of the mixed flow of gases at an exit of each ejector does not exceed 350 K.

In some embodiments, a gas expansion ratio in each ejector is at least three hundred and an efficiency of the gas turbine engine is at least 50%, and wherein cooling of the compressor is unnecessary.

In some embodiments, an efficiency of the gas turbine engine is at least 54%.

In some embodiments, the gas turbine engine is bladeless at least in a first stage turbine and wherein a temperature inside the combustion chamber is at least 2000K.

These and other features, aspects and advantages of the present invention will become better understood with reference to the following drawings, descriptions and claims.

BRIEF DESCRIPTION OF THE DRAWINGS

Various embodiments are herein described, by way of example only, with reference to the accompanying drawings, wherein.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

In modern gas turbine vehicle engines, the ratio of air compression in the air compressor preceding combustion chamber is 30 or more. Due to this compression, during gases expansion in the multistage turbine about 90% of the thermal energy of the combusted fuel is converted into mechanical energy of rotation of the turbine (Nturbine/Nf; where Nturbine is the turbine power and Nf is the thermal power of the combustion chamber. In order to achieve the required degree of compression of air in the compressor, some part of the mechanical energy of the turbine is transmitted to the compressor. In order to receive the output gases with a temperature admissible for the rotor and stator blades (not too high temperature), the combustor is fed with the amount of air 4 times greater than needed for complete combustion of the fuel. Therefore, up to 60% of the energy consumption is used for air compression. The payload in the conventional transport gas turbine engines is about 30% of the thermal energy of the fuel burned.

The invention generally provides a reaction gas turbine whose construction avoids the use of expensive materials. In certain embodiments, all components of the gas turbine engine are constructed of relatively cheap materials, with no special thermal endurance properties. In addition, the compressor is not cooled in certain embodiments. In some embodiments, the efficiency of the gas turbine engine exceeds 50%. In certain embodiments, the invention avoids undue stress at the turbine disk (impeller) caused by extremely high velocities of the exhaust gases (and the high orbital velocity of the impeller). In certain embodiments, non-limiting examples of the circumferential velocity of the ejector(s) in the invention is 425 m/s or 475 m/s or 500 m/s.

The principles and operation of a turbine engine with mixed flow ejectors may be better understood with reference to the drawings and the accompanying description.

As seen from FIGS. 1-3B, in one embodiment, the invention is a gas turbine engine 10, comprising a central power shaft 20, a rotatable turbine impeller 30 mounted on the shaft 20 and having a cavity 32, in one non-limiting example, an annular cavity 32. In certain embodiments, as can be seen from FIG. 1, the gas turbine engine 10 is bladeless.

Figure 2:
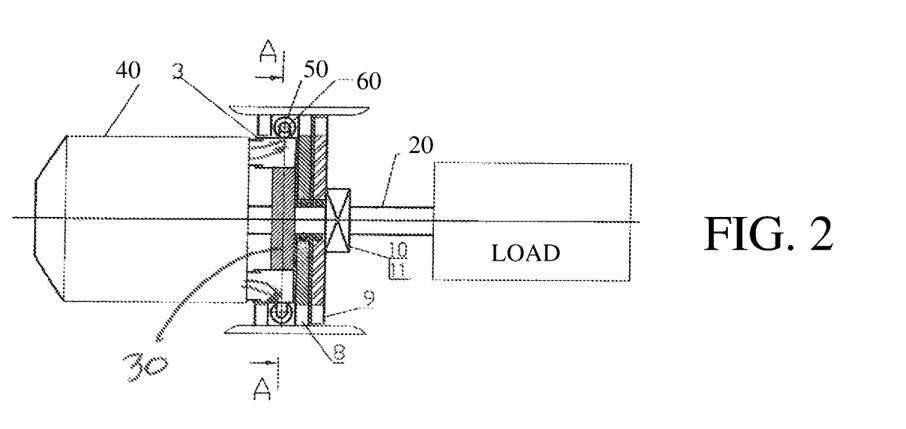
FIG. 2 is a schematic view in cross-section of a gas turbine engine, in accordance with an embodiment of the invention.

Gas turbine engine 10 further comprises a compressor 40. In one non-limiting implementation shown in FIG. 3B the impeller 30 is the final portion of compressor 40 (blades 44 of compressor 40 are visible). In another non-limiting implementation compressor 40 is outside of impeller 30. What is depicted in FIG. 2 can be either option.

Compressor 40 is configured to receive power from the central power shaft (for example by having a compressor rotor (not shown) connected through the working shaft 20 to the impeller 30. Compressor 40 may be configured such that compressed air exiting the compressor 40 at exit 3 (FIG. 2) enters the cavity 32, such as an annular cavity, of the impeller 30.

Gas turbine engine 10 may further comprise one or more ejectors 50 mounted on a periphery of the impeller 30. Ejectors 60 are substantially equidistant from the power shaft 20 in some embodiments. In one embodiment, each ejector 50 has a combustion chamber 60 including an outer wall 62, a mixing chamber 70 downstream (in terms of gas flow) of the combustion chamber 60 and a passageway 80 to the mixing chamber 70 from an inlet to the ejector 50. The passageway 80 comprises the area between the outer wall 62 of the combustion chamber 60 and an inner wall of the ejector 50. The passageway 80 is a diffuser 80 (i.e. a passageway in which the velocity of the flow decreases and its pressure and temperature increase).

Figure 3A:
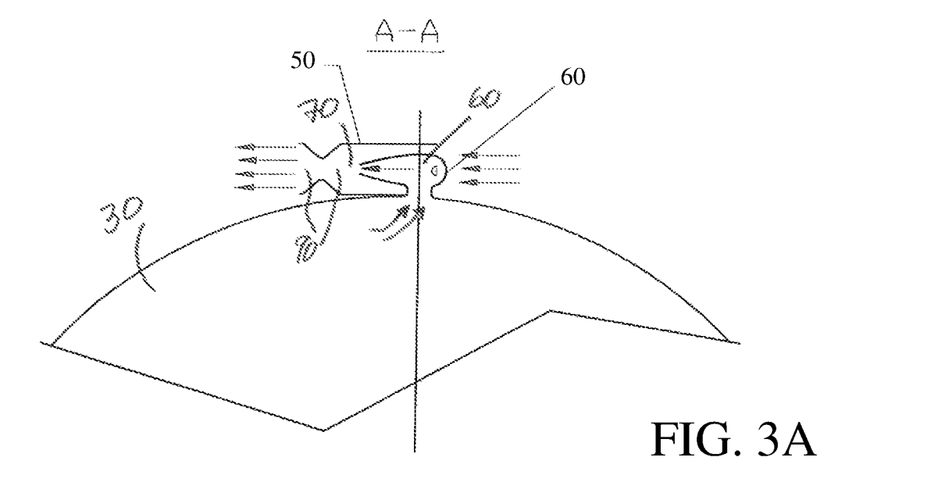
FIG. 3A is a sectional view of the ejector taken along line A-A of FIG. 2, in accordance with an embodiment of the invention.
Figure 3B:
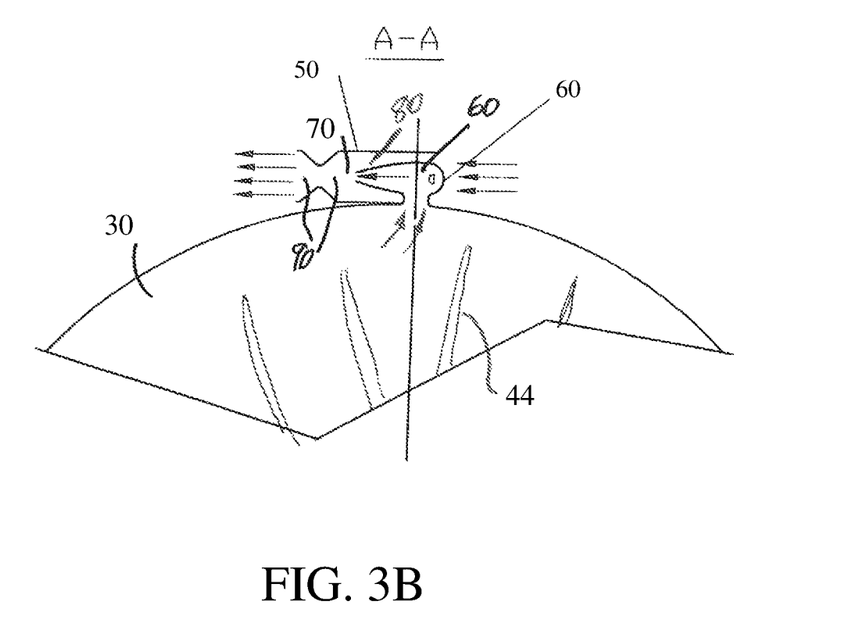
FIG. 3B is a sectional view of the ejector taken along line A-A of FIG. 2 showing the impeller as a final portion of the compressor, in accordance with an embodiment of the invention.
Figure 4:
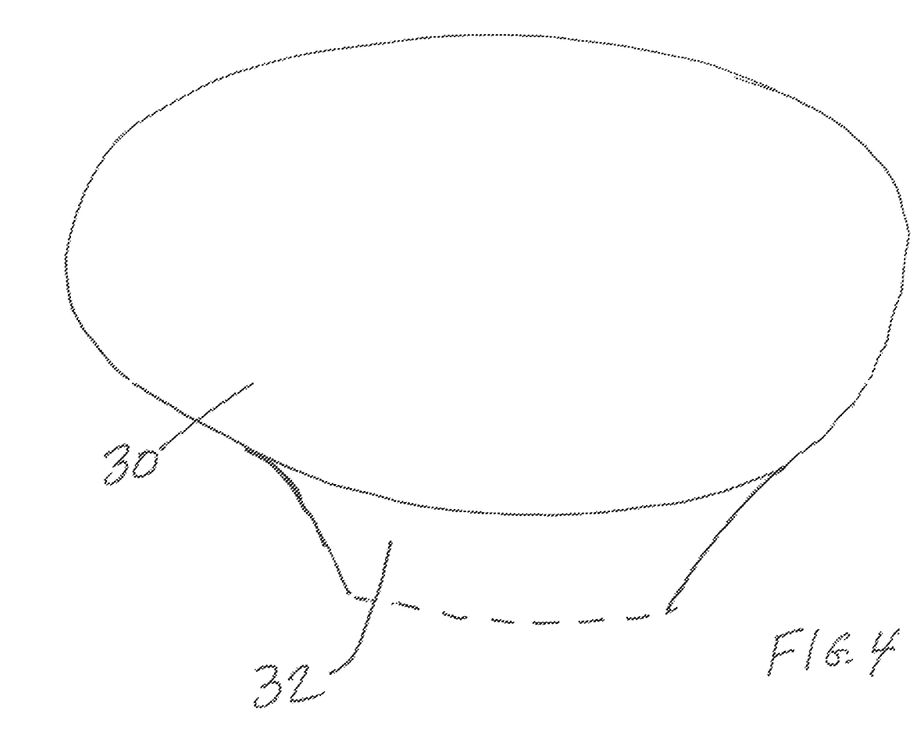
FIG. 4 is a partial schematic of components shown in the photograph of FIG. 1 showing cavity 32.

Although FIG. 3A-3B depict passageway 80 as being on one side of combustion chamber 60, this is only one non-limited example of many possible constructions. In other implementations, for example, passageway 80 may surround combustion chamber 60 on both sides.

Passageway 80 is configured to receive ejected air (i.e. air that comes from outside the turbine) to enter the ejector 50 and to bypass the combustion chamber 60 while traveling to the mixing chamber 70 such that in the mixing chamber 70 the ejected air mixes with a flow of hot gases that has exited the combustion chamber 60 to create a mixed flow of gases. In a typical embodiment, the ejected air is braked in the diffuser of the ejector 50, while the pressure and temperature of the ejected air increase. In the mixing chamber 70, the ejected air flow (from outside the turbine) and the ejecting air (from combustion chamber 60) flow are mixed and the enthalpy of the mixed flow is equal to the sum of their enthalpies.

The width or other geometry of the diffuser 80 is important in some embodiments. and may be calculated using the book "Inkjet Apparatus" by Sokolov E and Zinger N (last printed 1989 in Moscow).

FIG. 2 also depicts blades 8 of the stator of a second stage turbine 9 and gears 10, 11 that connect the second stage turbine 9 to shaft 20.

Each ejector 50 may further comprise a convergent-divergent nozzle 90, also called a de Laval nozzle. The convergent-divergent nozzle 90 may be situated at the exit of the mixing chamber 70. The convergent-divergent nozzle 90 is configured to accelerate the mixed flow of gases moving through the convergent-divergent nozzle 90, thereby creating a reaction thrust and a moment of force on the shaft.

In certain embodiments of the invention, for each ejector, the mixed flow of gases exits the ejector tangentially to the turbine impeller.

Figure 1:
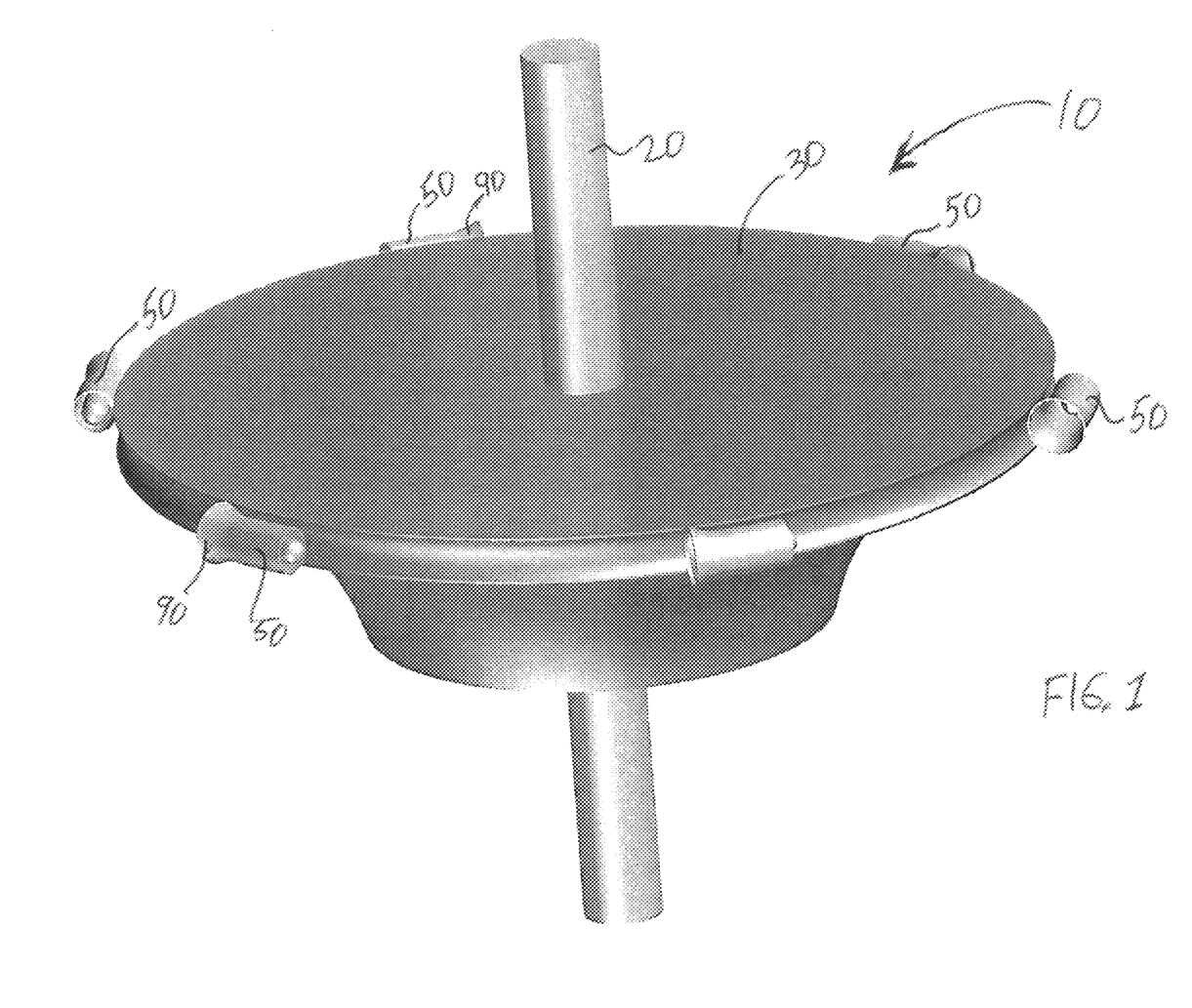
FIG. 1 is a photograph of a shaft, impeller and set of ejectors of a gas turbine engine, in accordance with one embodiment of the invention.

In the embodiment shown in FIG. 1, there are six ejectors. The one or more ejectors can be any number although issues of balance would be considered in selecting the exact number and their placement along the periphery of the impeller 30. In certain embodiments the one or more ejectors comprise two, three, four, five, six, seven, eight, nine or ten or more. In some other embodiments, the number of ejectors 60 comprise at least one, at least two, at least three, at least four, at least five, at least six, at least seven, at least eight, at least nine or at least ten. In certain embodiments, the number of ejectors is between three and nine.

Because, in certain embodiments, gas turbine 10 is bladeless, at least in the first stage turbine, this alleviates the concern about maintaining a relatively low temperature in the combustion chamber 60 (for example 1500K) to avoid burning the blades. In certain embodiments of the invention, therefore, the temperature inside the combustion chamber 60 can be 2,000K or even 2,500K. Furthermore, in certain embodiments less air is needed for combustion and therefore the stoichiometric ratio is lower for the invention in certain embodiments than for conventional (about 1.6 or 1.7 in certain embodiments compared to for example 3.5 for conventional gas turbine engines). Lack of blades, at least in the first stage turbine, also reduces the costs of the gas turbine engine.

The following calculations may be useful for understanding some of the advantages of the gas turbine engine of the invention in certain embodiments, for example its efficiency. The term "air jet engine" refers to an ejector with a combustion chamber inside it.

The thrust force of an air jet engine can be determined using Euler's number of motion theorem, $$P=Mex \cdot Cex-Men \cdot Corb+(Pex-Ph) \cdot Sex$$

where Mex is the gas flow through rate from the ejector nozzle; Cex is the gas flow rate from the ejector nozzle; Men is the ejected air flow through the inlet device; Corb is the ejector orbital speed; Pex is the static pressure of outgoing gases at the exit of the ejector nozzle; Ph is external pressure behind the ejector nozzle and Sex is the area of the exit of the ejector nozzle. When the orbital speed is greater than the speed of sound (for example M equals 1.3 . . . 1.5), the external air pressure directly behind the nozzle and at a certain distance from it is zero (Ph=0).

Mex=Mcc·(U+1) where Mcc is the gas flow through the combustion chamber nozzle and U is the ejection coefficient. Men=Mcc·U Mcc=Mc+Mf where Mc is the air flow from the compressor to the combustion chamber and Mf is the fuel consumption in the combustion chamber.

Mf=Nf/Gf where Nf is the thermal power of the combustion chamber and Gf is the calorific value of the fuel.

$$Nf = Mc \cdot \int_{Tc}^{Tcc} Cp(T)dT$$

where Tc is air temperature at the outlet of the compressor and Tcc is the temperature of gases in the combustion chamber and Cp(T) is the heat capacity of air as a function of temperature (note that the lower limit of the integral is Tc and the upper limit of the integral is Tcc).

The ejection coefficient, U, the parameters of the ejected and ejecting flows and the parameters of the mixed flow in the ejector (temperature and pressure) including the geometry of the diffuser can be calculated by the method given in the book "Inkjet Apparatus" by Sokolov E and Zinger N (last printed 1989 in Moscow).

The power of the jet turbine is calculated by the formula Nturb=P·Corb. The power of the gas turbine engine is calculated by the formula Neng=Nturb−Nc−Nen where Nc is compressor power supplying compressed air to the combustion chamber and Nen is the power expended on braking the ejected air in the ejector diffuser.

The thrust force of an air jet engine can also be represented as:

$$Ftr=Mex \cdot Vex-Men \cdot Vorb+(Pex-Ph)Sex$$

According to the results of the calculations Nc+Nen≈0.2 Nf when the efficiency of the compressor is 0.75. The thermal efficiency of the turbine at optimal operation is about 0.75 to 0.80. The thermal efficiency of the gas turbine engine is not less than 0.55. The outlet gas temperature differs slightly from the ambient temperature.

In certain embodiments of the invention, the efficiency of the gas turbine engine is at least 50%. For example, the efficiency of the gas turbine engine is between 50% and 60% in certain embodiments.

In certain embodiments, a temperature of the mixed flow of gases at an exit of each ejector does not exceed 350 K. For example, in three non-limiting examples, this gas temperature at turbine outlet (Tex) was calculated to be 320.5K, 326.7K and 334.1K respectively. As a result, in certain embodiments, a temperature of the flow of hot gases exiting the combustion chamber (which may be about 2000K in some cases) is more than six times a temperature of the mixed flow of gases exiting the nozzle.

Due to the use of the mixing chamber for mixing air exiting the combustion chamber 60 with ejected air (outside air) and due to the convergent-divergent nozzle 90 and other factors, the gas expansion ratio may exceed 2,000. The gas expansion ratio is defined as the ratio of the pressure of the gas exiting the nozzle 90 to the pressure of the gas in the combustion chamber 60.

In some embodiments, the compression ratio of the compressor is less than 6.0 for a circumferential velocity of each ejector of 500 m/s. In certain embodiments, the compression ratio of the compressor is less than 6.0 for a circumferential velocity of each ejector of 475 m/s. In certain embodiments, the compression ratio of the compressor is less than 5.5 for a circumferential velocity of each ejector of 425 m/s.

The expansion of gas from the combustion chamber in the engine of the invention occurs in two stages. In the first stage, gas from the combustion chamber ejects, compresses and heats the ejected air while its temperature decreases to the temperature of the mixed flow in accordance with the ejection coefficient: Tmix=(Tcc+Ten·U)/(U+, where Tcc is the temperature in the combustion chamber, Ten is the temperature of the ejected air in the diffuser of the ejector before mixing with the gas from the combustion chamber and U is the coefficient of ejection. In certain embodiments of the invention, the technical characteristics of which are listed below (and contrasted with the technical characteristics of five versions of Siemen's engines), for Tcc=2000 k with Vorb=425 m/s and adjusting for the non-linearity of the function Cp(T), Tmix=755K, Ten=330K, (Tcc/Tmix)$^{k/k-1}$=Πmix=68.13. If Vorb=475 m/s, Tmix=776K, and Ten=346K, Πmix=60.5. If Vorb=500 m/s, Tmix=782K and Ten=351K, Πmix=58.5.

In the second stage, the expansion of the mixed flow exiting the ejector nozzle 90 depends on the design of the nozzle 90, in accordance with known engineering formulations. If nozzle 90 is designed for example such that the expansion of the mixed flow in nozzle 90 is 25, then this provides a further multiplier of 25 which is applicable to each of the options whose technical characteristics are listed below (i.e. Πmix=25).

Accordingly, in certain embodiments, combining the two stages, the total expansion of gas exiting combustion chamber 60 from when the gas exits the combustion chamber 60 until it exits nozzle 90 is given by Πtot=Πmix·Πex. For the option of Vorb=425 m/s, Πtot=1703. For the option of Vorb=475 m/s, Πtot=1512.25. For the option of Vorb=500 m/s, Πtot=1462.5.

Given the low compression ratio of the compressor 40, which in three non-limiting embodiments discussed below was 4.83, 5.43 and 5.76 respectively, for each ejector a gas expansion ratio in the ejector is at least one hundred times a compression ratio of the compressor at least in certain embodiments. In certain other embodiments, for each ejector a gas expansion ratio in the ejector is at least four hundred times a compression ratio of the compressor, at least in some embodiments. In certain other embodiments, for each ejector a gas expansion ratio in the ejector is at least a thousand times a compression ratio of the compressor, at least in some embodiments.

Gases from the combustor engine are mixed in ejectors together with air ejected from outside. This prevents ingress of hot gases on the rotor and stator blades of the second stage turbine, which in turn allows raising the temperature in the combustor by 500K to 600K compared to the temperature in the combustion chamber of conventional gas turbine engine.

Thus, in the compressor in accordance with certain embodiments of the gas turbine engine of the invention, the level of compression and consumption of the air are lowered to (17-20)% of energy consumption. Besides, energy loss due to air resistance of the ejector is lowered to (5-8)% of energy consumption in certain embodiments. So the total loss in compression is decreased to less than (22-28)% of the energy consumption. Estimated turbine efficiency of this engine is about (75-85)%. The share of the payload in the proposed engine is about 60% of the energy consumption.

It is known that internal gas energy (enthalpy) can be converted into mechanical energy during gas expansion.

In the existing gas turbine engines the compressed air from the compressor enters a stationary combustion chamber, where it is heated. Then it expands while passing through the turbine blades. The degree of expansion of the gases in the ideal turbine equals to the degree of compression in the compressor.

In the proposed gas turbine of the invention in accordance with certain embodiments the compressed air from the compressor enters a mobile combustion chamber which is mounted on the periphery of the turbine wheel. Thus the compressed air expands, while exiting the combustion chamber through the ejector nozzle.

It is known that in a moving continuous medium (in this case in air) with a flat body there occurs a stern zone of reduces pressure.

The length of this zone is a function of the speed of movement and the body shape. For example, at a speed V=450 m/c the static pressure on a section of the ejector nozzle is practically equal to zero. In this case, it is possible to construct the nozzle in such a way that the gas expansion ratio exceeds the compression ratio by dozens of times.

Based on the foregoing, we can draw the following conclusions: The proposed engine operating principle allows one, in certain embodiments of the invention, to: (i) Increase the share of gas enthalpy converted to mechanical energy, (ii) significantly decrease energy consumption for compressing the air that is fed into the combustion chamber and (iii) Increase the efficiency of the engine up to 0.6. The results of calculations are as follows in certain embodiments.

Calculation of the efficiency of the gas turbine engine:
a) The coefficient of the turbine consumption of gas energy coming from combustion chamber is equal to $\eta=(Tcc-Tex)/Tcc$, where $Tcc=2000K$ is the temperature of the gas inside the combustion chamber and Tex is the temperature of the gas at the turbine exit. The following relation holds: $Tex=Tcc\,(Pex/Pcc)^{((Kt-1)/Kt)}$, where Pex is the pressure of the gas at the turbine exit, Kt is the adiabatic index of the gases that expand in turbine, and Pcc is the pressure at the combustion chamber. b) The Energy Conversion Efficiency (ECF) of conventional gas turbine engine is equal to $\eta ecf=(Tcc-(Tc-T0)-Tex)/Tcc$, where $T0=288K$ is the temperature of the environment, and Tc is the air temperature at the exit of the compressor. Tc is given by $Tc=T0(1-(Pc/P0)^{((Kc-1)/Kc)}-1)/\eta ecf)$, where Kc is the adiabatic index of the compressed air, Pc is the pressure at the exit of the compressor, and P0 is the pressure at the entrance of the compressor. In the conventional turboshaft engine we have the following relations:

$$Pex\sim P0,\ Tex=Tcc(Pex/Pcc)^{(Kt-1)/Kt},\ Tcc=2000K.$$

c) The ECF of the proposed turboshaft engine $\eta ecf,pr=(Tcc-(Tej-T0)-Tex)/Tcc$, where Tej is the temperature of the gases in the mixing chamber of the ejector, and $Tex=Tcc\,(Pex/Pcc)^{((Kt-1)/Kt)}$, where $P_{ex}\ll P\_0$. An example of the dependence of the ECF on the magnitude of the gases expansion at the turbine exit is shown on FIG. 2.

The following describes five versions of Siemen's engines used in power stations. Siemen's SGT5-2000E engine having power equal to 117 MWt and a compression ratio of 12.8 has an efficiency of 35.5%, a gas temperature at the turbine outlet (Tex) of 849K (Kelvin) and a fuel consumption per 1 kWt of 0.233 kg. Siemen's SGT5-4000F engine having power equal to 392 MWt and a compression ratio of 20.0, an efficiency of 41%, a gas temperature at the turbine outlet (Tex) of 872K (Kelvin) and a fuel consumption per 1 kWt of 0.204 kg. Siemen's SGT6-5000F engine having power equal to 250 MWt and a compression ratio of 18.9 has an efficiency of 39.3%, a gas temperature at the turbine outlet (Tex) of 871K (Kelvin) and a fuel consumption per 1 kWt of 0.213 kg. Siemen's SGT5-8000H engine having power equal to 450 MWt and a compression ratio of 20.0 has an efficiency of 41%, a gas temperature at the turbine outlet (Tex) of 903K (Kelvin) and a fuel consumption per 1 kWt of 0.2044 kg. Siemen's SGT5-8000H engine having power equal to 310 MWt and a compression ratio of 20.0 has an efficiency of 40%, a gas temperature at the turbine outlet (Tex) of 918K (Kelvin) and a fuel consumption per 1 kWt of 0.2093 kg.

In contrast, based on Applicant's calculations, in one non-limiting example of the invention with circumferential velocity (Vorb) of 425 m/s and an ejection coefficient, U, of 3.25, the engine has a compression ratio of 4.83, an ejector ratio of 1.9, power of 966.15 kW (kilowatt), efficiency of 54.6%, Tex (has temperature at turbine outlet) of 320.5K and fuel consumption per 1 kW of 0.154 kg. In a second non-limiting example of the invention with circumferential velocity (Vorb) of 475 m/s and an ejection coefficient, U, of 3.196, the engine has a compression ratio of 5.43, an ejector ratio of 2.14, power of 992.72 kW, efficiency of 56.7%, Tex (has temperature at turbine outlet) of 326.7K and fuel consumption per 1 kW of 0.149 kg. In a third non-limiting example of the invention with circumferential velocity (Vorb) of 500 m/s and an ejection coefficient, U, of 3.17, the engine has a compression ratio of 5.76, an ejector ratio of 2.264, power of 1014.6 kW, efficiency of 58.5%, Tex (has temperature at turbine outlet) of 334.1K and fuel consumption per 1 kW of 0.1436 kg.

In these non-limiting examples, the compression ratio of the gas turbine engine of the invention is significantly lower than the Siemens engines and the efficiency of the engine of the invention is significantly higher. Furthermore, the fuel consumption of the engine of the invention is significantly lower.

In one embodiment of the invention, the gas turbine engine is a bladeless gas turbine engine comprising a central power shaft 20, a rotatable turbine impeller 30 mounted on the shaft 20 and having a cavity. Its compressor has a compression ratio of six or less inside the impeller. The convergent-divergent nozzle 90 is configured such that the mixed flow of gases exiting the mixing chamber enters the convergent-divergent nozzle and is accelerated in both a convergent portion of the convergent-divergent nozzle and in a divergent portion of the convergent-divergent nozzle, thereby creating a reaction thrust and a moment of force on the shaft. The temperature of the mixed flow of gases at an exit of each ejector does not exceed 350 K. In certain embodiments, this temperature is 320.5K, 326.7K or 334.1K in three different versions of the invention (using different circumferential velocities of the ejector).

In some embodiments, a gas expansion ratio in each ejector 60 is at least three hundred and an efficiency of the gas turbine engine is at least 50%, and cooling of the compressor is unnecessary. In some embodiments, the efficiency of the gas turbine engine 10 is at least 54%.

In one embodiment of the invention, the compressor 40 does not need any cooler. In one non-limited implementation, the invention is a bladeless gas turbine engine 10, comprising a central power shaft 20; a rotatable turbine impeller 30 mounted on the shaft and having a cavity; a compressor 40 receiving power from the central power shaft and configured such that compressed air exiting the compressor enters the cavity of the impeller; two or more ejectors mounted on a periphery of the impeller, each ejector having a combustion chamber including an outer wall; a mixing chamber downstream of the combustion chamber; a passageway to the mixing chamber for ejected air (outside air) to enter the ejector and bypass the combustion chamber while traveling to the mixing chamber such that in the mixing chamber the ejected air (outside air) mixes with a flow of hot gases that has exited the combustion chamber to create a mixed flow of gases; and a convergent-divergent nozzle configured such that the mixed flow of gases exiting the mixing chamber enter the convergent-divergent nozzle and is accelerated in both a convergent portion of the convergent-divergent nozzle and in a divergent portion of the convergent-divergent nozzle, thereby creating a reaction thrust and a moment of force on the shaft, wherein a temperature of the mixed flow of gases at an exit of each ejector does not exceed 350 K.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A gas turbine engine, comprising:
   a central power shaft;
   a rotatable turbine component mounted on the shaft and having a cavity, the rotatable turbine component being bladeless;
   a compressor configured to receive power from the central power shaft and configured such that compressed air exiting the compressor enters the cavity of the rotatable turbine component;
   one or more ejectors mounted on a periphery of the rotatable turbine component, each ejector having:
   a combustion chamber including an outer wall, the combustion chamber burning fuel with the compressed air received from the cavity to produce a flow of hot gases;
   a mixing chamber downstream of the combustion chamber;
   a passageway to the mixing chamber, the passageway configured to receive air from outside the gas turbine engine that enters the ejector and bypasses the combustion chamber while traveling to the mixing chamber,
   the mixing chamber configured to mix the air from outside the gas turbine engine that enters the ejector, with the flow of hot gases that exits the combustion chamber, to create a mixed flow of gases; and
   a convergent-divergent nozzle at an exit of the mixing chamber that accelerates the mixed flow of gases moving through the convergent-divergent nozzle, thereby creating a reaction thrust and a moment of force on the shaft.

2. The gas turbine engine of claim 1, wherein a temperature of the mixed flow of gases at an exit of each ejector does not exceed 350 K.

3. The gas turbine of claim 1, wherein for each ejector a temperature of the flow of hot gases exiting the combustion chamber is more than five times a temperature of the mixed flow of gases exiting the nozzle.

4. The gas turbine engine of claim 1, wherein for each ejector the mixed flow of gases exits the ejector tangentially to the rotatable turbine component.

5. The gas turbine engine of claim 1, wherein for each ejector a gas expansion ratio in the ejector is at least one hundredfold a compression ratio of the compressor.

6. The gas turbine engine of claim 1, wherein for each ejector a gas expansion ratio in the ejector is at least four hundredfold a compression ratio of the compressor.

7. The gas turbine engine of claim 1, wherein for each ejector a gas expansion ratio in the ejector is at least a thousandfold a compression ratio of the compressor.

8. The gas turbine of claim 1, wherein the compression ratio of the compressor is less than 6.0 for a circumferential velocity of each ejector of 500 m/s.

9. The gas turbine of claim 1, wherein the compression ratio of the compressor is less than 6.0 for a circumferential velocity of each ejector of 475 m/s.

10. The gas turbine of claim 1, wherein the compression ratio of the compressor is less than 5.5 for a circumferential velocity of each ejector of 425 m/s.

11. The gas turbine engine of claim 1, wherein the one or more ejectors comprise at least two ejectors.

12. The gas turbine of claim 1, wherein the one or more ejectors comprise at least three ejectors.

13. The gas turbine engine of claim 1, wherein the one or more ejectors comprise from three to nine ejectors.

14. A bladeless gas turbine engine, comprising:
    a central power shaft;
    a rotatable turbine component mounted on the shaft and having a cavity, wherein the rotatable turbine component is bladeless;
    a compressor having a compression ratio of six or less, the compressor receiving power from the central power shaft and configured such that compressed air exiting the compressor enters the cavity of the rotatable turbine component;
    two or more ejectors mounted on a periphery of the rotatable turbine component, each ejector having:
    a combustion chamber including an outer wall, the combustion chamber burning fuel with the compressed air received from the cavity to produce a flow of hot gases;
    a mixing chamber downstream of the combustion chamber;
    a passageway to the mixing chamber, the passageway configured to receive air from outside the gas turbine engine that enters the ejector and bypasses the combustion chamber while traveling to the mixing chamber, the mixing chamber configured to mix the air from outside the gas turbine engine that enters the ejector, with the flow of hot gases that exits the combustion chamber, to create a mixed flow of gases; and a convergent-divergent nozzle configured such that the mixed flow of gases exiting the mixing chamber enter the convergent-divergent nozzle and is accelerated in both a convergent portion of the convergent-divergent nozzle and in a divergent portion of the convergent-divergent nozzle, thereby creating a reaction thrust and a moment of force on the shaft, wherein a temperature of the mixed flow of gases at an exit of each ejector does not exceed 350 K.

15. The gas turbine engine of claim 14, wherein a gas expansion ratio in each ejector is at least three hundred.

16. The gas turbine engine of claim 14, wherein a temperature inside the combustion chamber is at least 2000K.

* * * * *